Patented Dec. 17, 1946

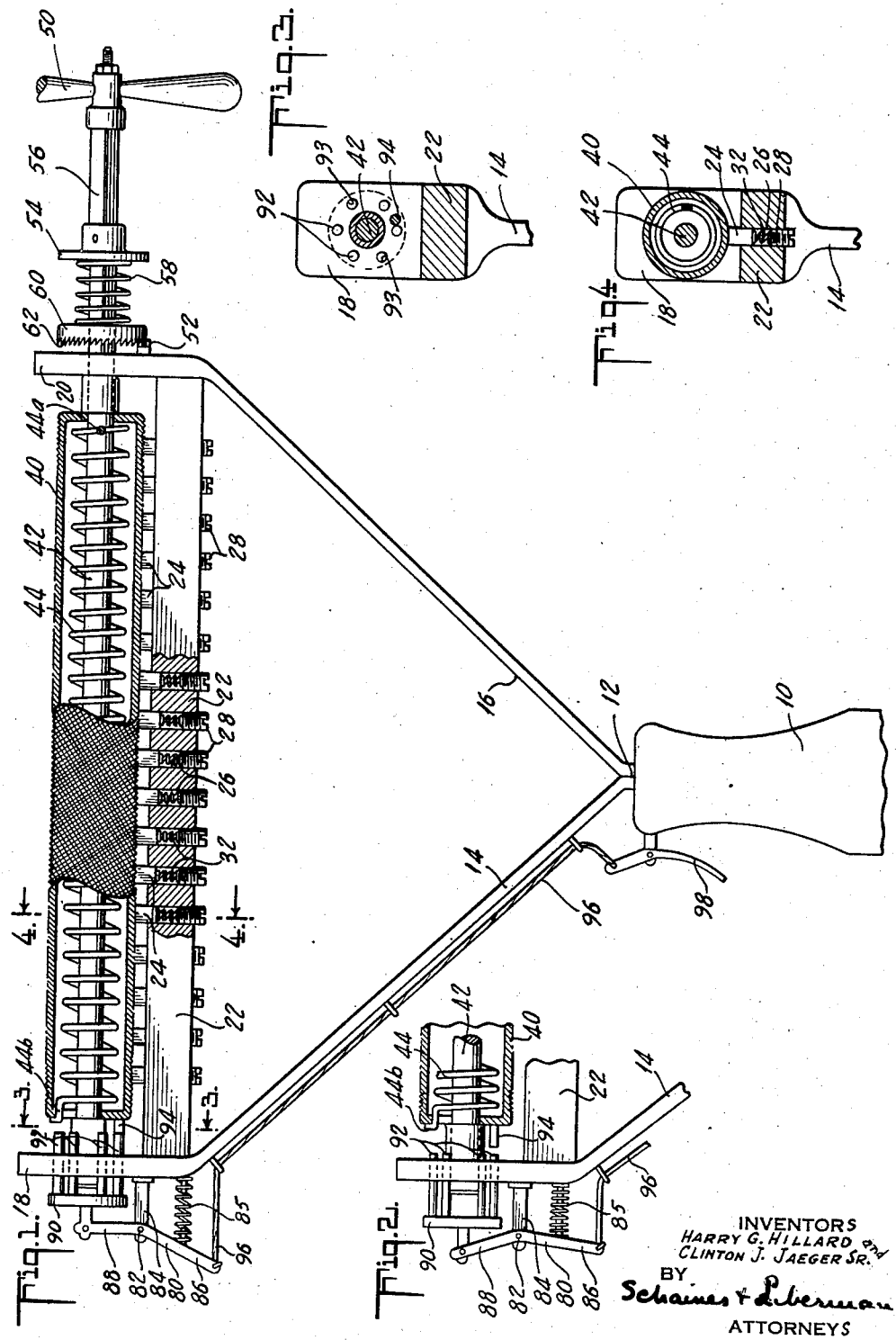

2,412,684

UNITED STATES PATENT OFFICE 2,412,684

LIGHT-PRODUCING DEVICE

Harry G. Hillard and Clinton J. Jaeger, Sr.,
Bayonne, N. J.

Application April 9, 1945, Serial No. 587,410

5 Claims. (Cl. 67—28)

Our invention relates generally to light-producing mechanisms, and in particular it relates to a device for producing light of such intensity as to permit the taking of photographs thereby.

Artificially-produced light for the taking of photographs is and has been well known for years and has been produced, for example, by the ignition of a powder of magnesium filings mixed with potassium chlorate, electric flood lights, electric flash bulbs, etc. These methods and apparatuses, while producing light of sufficient intensity to permit the taking of photographs thereby, are accompanied by explosions, smoke or the like, are awkward and cumbersome to use and are rather expensive in operation. It is the main object of our invention, therefore, to provide an apparatus for producing light of sufficient intensity to permit the taking of photographs thereby which is simple to construct and operate, is composed of inexpensive parts, and long lasting in use.

Another object of our invention is the provision of a device for producing light of sufficient intensity to permit the taking of photographs thereby which comprises means for urging a plurality of pyrophoric elements against a scored surface in combination with means for causing relative movement between the scored member and the pyrophoric elements.

A further object of our invention is the provision of a device for producing light of sufficient intensity to permit the taking of photographs thereby which comprises a member containing a number of pyrophoric elements, means to spring urge these elements into engagements with a scored member, means to rotate the scored member against the pyrophoric elements, and means to tension the scored member for rotation.

Other and further objectives of my invention will in part be pointed out hereinbelow in connection with the following description of an illustrative embodiment thereof, while still other objects will be obvious therefrom.

In the drawing annexed hereto and forming a part hereof,

Figure 1 is a side elevational view, partly broken away to show details of internal construction, and partly in section, of one form of device constructed according to and embodying our invention;

Fig. 2 is a side elevational view of a detail showing the roller locking mechanism in a different position from that illustrated in Fig. 1;

Fig. 3 is a vertical section on the line 3—3 of Fig. 2; and

Fig. 4 is a vertical section on the line 4—4 of Fig. 1.

Referring to the drawing, in the several views of which similar parts will be designated by similar reference numerals, our device comprises a support or handle member 10, of any suitable size and shape as to permit its attachment to a camera (not shown) on which support 10 we mount a Y-bracket 12 having a pair of outwardly diverging arms 14, 16, terminating in a pair of upstanding parallel arms 18, 20. Between arms 18, 20 and near the bottom thereof, we dispose a cross-bar 22 in which we dispose a plurality of pyrophoric elements 24, 24. A number of vertically extending openings 26, 26 are formed as by coring, boring or otherwise, through bar 22, the bottom margins of which openings 26, 26 are threaded to receive a threaded plug 28. After the pyrophoric elements 24, 24, flint or otherwise, are inserted in each of openings 26, 26, a normally expanding spring 32 is positioned under each element 24 and the plug 28 threaded into each opening, this arrangement normally and resiliently urging the pyrophoric elements 24, 24 upwardly. Bar 22 is fixed between bracket arms 18, 20 against any rotation.

Above bar 22, and parallel therewith, we dispose a hollow cylindrical roller 40, the surface of which is scored or otherwise roughened. We provide an elongated rod 42 which passes through aligned openings in arms 18, 20 and through aligned openings in the reduced ends of roller 40, to maintain said roller 40 in slightly spaced, parallel relation above the pyrophoric element containing bar 22, and we provide means to cause rotation of the roller with respect to the fixed pyrophoric elements, as desired. These means comprise a large coiled spring 44 which is disposed within roller 40 and surrounds rod 42, one end 44a of which spring 44 is secured to rod 42 to rotate therewith, and the other end 44b of which spring 44 is secured to roller 40 at the opposite end thereof. Rod 42 is provided with a projecting portion or extension 56 beyond arm 20, and has a key or handle 50, by actuation of which key or handle rod 42 may be rotated in a counterclockwise direction to build up tension in spring 44.

A pin 52 is provided projecting outwardly from arm 20, which pin is adapted to be engaged by a ratcheted disc 60 slidably disposed on shaft extension 56. A collar 54 is fixed on shaft 56 and between this collar 54 and disc 60 a coil spring 58 is provided which normally urges disc 60 into engagement with pin 52. Extension 56 is square or otherwise shaped in cross section to permit disc 60 to slide laterally therealong and to prevent said disc 60 from rotating thereabout. Teeth 62, 62 on disc 60 are so biased as to permit rod 42, 56 to be turned counterclockwisely while preventing same from turning in a clockwise direction.

We also provide means to lock roller 40 against rotation while tension is being built up in coil spring 44 by rotation of rod 42, 56, these means comprising an angulated lever 80 pivoted at 82 to a stud 84 projecting outwardly from arm 14. A spring 85 is provided, trapped between lever arm 86 and Y-arm 18 normally urging lever arm 86 outwardly and the other lever arm 88 inwardly. A spider 90 is provided, linked to the end of lever arm 88, said spider 90 having a plurality of finger pieces 92, 92 projecting inwardly therefrom and through suitable openings 93, 93 in Y-arm 18, finger pieces 92, 92 normally reaching towards roller 40 under the urging of spring 85, one of fingers 92 being engaged by a pin 94 projecting outwardly and laterally from roller 40 (see Fig. 1). A string, wire or the like, as 96, may be secured to the free end of lever arm 86, and led down to a point adjacent handle or mount 10, and secured to trigger 98. As shaft or rod 42 is rotated, end 44a of spring 44 is carried around with it, the other end 44b being held by the locking of roller 40.

With the parts in the position shown in Fig. 1, and roller 40 locked against rotation, counterclockwise rotation of key or handle 50, causes rotation of shaft 42 and tensioning of spring 44. When trigger 98 is pressed inwardly towards handle 10, operating lever 80 and spider 90, the roller will be released and the parts will assume the positions shown in Fig. 2, fingers 92, 92, being retracted and drawn out of engagement with pin 94, permitting roller 40 to be rotated by the expansion rotation of spring 44, and striking sparks from the engagement of pyrophoric elements 24, 24 against the scored surface of roller 40, producing the necessary amount of light.

A suitable, conventional reflector may be provided (not shown), to cause the light so generated to be directed in any direction desired, and the number of pyrophoric elements must be such as to provide light of sufficient intensity to permit the taking of photographs. It will be understood that the action of the camera shutter may be easily synchronized with the light production, for the duration of the light is easily controllable by means of trigger 98, and it is possible with my device to continue the light at peak intensity during the opening and closing of the shutter, thereby avoiding the necessity for precise synchronization of the camera shutter with the split second peak intensity of light produced as by magnesium filings, flash bulbs, etc. As a matter of fact, with my device it is possible to avoid any operative connection whatsoever to the camera shutter. The light can be created by disengagement of pin 94 from finger pieces 92, 92 and prolonged until after the camera shutter is actuated, when the rotation of roller 40 may be stopped and the light production ended.

Our device is composed of easily manufactured parts, and its assembly calls for no special skill or experience. The pyrophoric elements may be used time and time again (their replacement being easily and cheaply accomplished), and the device will be very inexpensive to operate.

Having now described our invention, what we claim and desire to secure by Letters Patent is:

1. A device of the character described comprising a pair of straight elongated, axially aligned and slightly spaced apart members, means to support said members in said relation, one of the members being fixed and the other thereof being rotatable, the fixed member having a plurality of pyrophoric elements disposed therewithin and having means to resiliently urge said elements against the rotatable member, whereby upon rotation of the latter a shower of sparks will be produced from between the two members concentrated in a straight path.

2. A device of the character described comprising a supporting bracket having a pair of spaced arms, a pair of axially aligned and spaced-apart straight members disposed between the spaced arms, one of the members being fixed and the other being rotatable, one of the members having a plurality of pyrophoric elements disposed therewithin and having means to resiliently urge said elements against the other of said members, means to tension the rotatable member for rotation, and means to hold the rotatable member against rotation during the tensioning, and means to release the holding means to permit the rotatable member to rotate and strike a shower of sparks from the pyrophoric elements, said shower falling on one side of the device in the direction of rotation and concentrated in a straight path.

3. A device of the character described comprising a support bracket having a pair of straight axially aligned and spaced-apart members disposed between the bracket arms, one of the members being fixed against rotation and the other comprising a rotatable cylinder, the fixed member having a plurality of pyrophoric elements disposed therewithin and having means to resiliently urge said elements against the cylinder, means comprising in part a rotatable shaft to tension the cylinder for rotation, means to hold the cylinder against rotation during the tensioning, means to release the holding means to permit rotation of the cylinder, and means to hold the shaft against rotation during rotation of the cylinder, and means to release the holding means to permit the rotatable member to rotate and strike a shower of sparks from the pyrophoric elements, said shower falling on one side of the device in the direction of rotation and concentrated in a straight path.

4. A device of the character described for creating a shower of sparks concentrated in a straight path comprising a support bracket having a pair of spaced arms, a first pin on one arm projecting outwardly therefrom, a second pin on the other arm projecting outwardly therefrom, a straight rod disposed between the arms and a cylinder disposed between the arms in axially aligned and spaced relation to the rod, a plurality of pyrophoric elements disposed within the rod and means to resiliently urge the elements against the cylinder, means to mount the cylinder as aforesaid comprising a shaft journalled in the bracket arms and extending beyond one thereof, means on the extension to engage the second pin permitting rotation of the extension and of the shaft in one direction, and means on the cylinder engaging the first of said pins to prevent rotation of the cylinder.

5. A device as in claim 4, in which the means to hold the cylinder comprise, in part, a plurality of fingers extending through the bracket arm, one of which fingers is engageable by the first referred to pin.

HARRY G. HILLARD.
CLINTON J. JAEGER, Sr.